US009566669B2

(12) United States Patent
Cheah et al.

(10) Patent No.: US 9,566,669 B2
(45) Date of Patent: Feb. 14, 2017

(54) TIP FABRICATION FOR ROTOR BLADE OR STATOR VANE AIRFOIL

(71) Applicant: PRATT & WHITNEY SERVICES PTE LTD, Jurong Town (SG)

(72) Inventors: Kim Wei Cheah, Singapore (SG); Ting Cher Ng, Singapore (SG)

(73) Assignee: United Technologies Corporation, Hartford, CT (US)

( * ) Notice: Subject to any disclaimer, the term of this patent is extended or adjusted under 35 U.S.C. 154(b) by 95 days.

(21) Appl. No.: 14/407,252

(22) PCT Filed: Jun. 13, 2013

(86) PCT No.: PCT/IB2013/001243
§ 371 (c)(1),
(2) Date: Dec. 11, 2014

(87) PCT Pub. No.: WO2014/006467
PCT Pub. Date: Jan. 9, 2014

(65) Prior Publication Data
US 2015/0158133 A1    Jun. 11, 2015

(30) Foreign Application Priority Data
Jun. 13, 2012    (SG) .............................. 201204378-2

(51) Int. Cl.
*B23P 15/02*    (2006.01)
*F01D 5/00*    (2006.01)
(Continued)

(52) U.S. Cl.
CPC ................ *B23P 15/02* (2013.01); *B23P 6/007* (2013.01); *F01D 5/005* (2013.01); *F01D 5/14* (2013.01);
(Continued)

(58) Field of Classification Search
CPC ........... B23P 6/002; B23P 6/007; B23P 6/045; F05D 2230/72; F05D 2230/80; F01D 5/005; B23C 2215/44
See application file for complete search history.

(56) References Cited

U.S. PATENT DOCUMENTS 5,168,608 A * 12/1992 Fraser .................... B23B 41/00
                                                         29/26 A
5,913,555 A    6/1999 Richter et al.
(Continued)

OTHER PUBLICATIONS

International Search Report dated Feb. 27, 2014, for PCT/IB2013/001243.
(Continued)

*Primary Examiner* — Christopher Besler
(74) *Attorney, Agent, or Firm* — Kinney & Lange, P.A.

(57) ABSTRACT

A method comprises identifying an engine-run tip position for an airfoil having a tip section and a root section. The engine-run tip position is displaced and rotated with respect to a nominal position, as defined with respect to the root section before engine running. A airfoil tip is formed on the airfoil, and a machining datum is defined adjacent the airfoil tip. The tip section is translated and rotated to locate the airfoil tip in the nominal position, without respect to a location of the root section. The tip section is restored to a nominal profile by machining the airfoil tip along a machining path defined with respect to the machining datum, wherein the machining path is independent of the displacement and rotation of the engine-run tip position and independent of the position of the root section.

10 Claims, 6 Drawing Sheets

(51) Int. Cl.
  *F01D 5/14*   (2006.01)
  *F01D 9/02*   (2006.01)
  *B23P 6/00*   (2006.01)
  *F01D 5/20*   (2006.01)

(52) U.S. Cl.
  CPC ............... *F01D 9/02* (2013.01); *B23P 6/002* (2013.01); *F01D 5/20* (2013.01); *F05D 2230/232* (2013.01); *F05D 2230/72* (2013.01); *F05D 2230/80* (2013.01); *Y10T 29/49336* (2015.01)

(56) References Cited

U.S. PATENT DOCUMENTS

| | | |
|---|---|---|
| 2002/0162220 A1 | 11/2002 | Updegrove et al. |
| 2008/0159869 A1 | 7/2008 | Rueher et al. |
| 2009/0246031 A1 | 10/2009 | Rose |
| 2009/0255114 A1* | 10/2009 | Kernozicky ............ B23P 6/002 29/889.1 |
| 2009/0269206 A1* | 10/2009 | Yelistratov ............. B23P 6/007 416/229 A |
| 2009/0313822 A1 | 12/2009 | Lee et al. |

OTHER PUBLICATIONS

International Preliminary Report on Patentability dated Dec. 16, 2014, for PCT/IB2013/001243.

* cited by examiner

TIP FABRICATION FOR ROTOR BLADE OR STATOR VANE AIRFOIL

BACKGROUND

This invention relates generally to turbomachinery, and specifically to rotor blade and stator vane airfoils for the compressor and turbine sections of a gas turbine engine, or the fan section of a turbofan engines. In particular, the invention concerns airfoil tip fabrication and restoration, and manufacturing, maintenance and repair methods for new and engine-run rotor blade and stator vane airfoils.

Gas turbine engines provide reliable, efficient power for a wide range of applications, including aviation and industrial power generation. In typical designs, the power core is formed of a compressor, combustor and a turbine, arranged in flow series with an upstream inlet and downstream exhaust.

The compressor section compresses air from the inlet, which is mixed with fuel in the combustor and ignited to generate hot combustion gas. The turbine section extracts energy from the expanding combustion gas, and drives the compressor via a common shaft. Energy is delivered in the form of rotational energy in the shaft, reactive thrust from the exhaust, or both.

Small-scale gas turbines generally utilize a one-spool design, with co-rotating compressor and turbine sections. Larger-scale combustion turbines including aircraft engines and industrial gas turbines (IGTs) are typically arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Aviation applications include turbojet, turbofan, turboprop and turboshaft engine configurations. Turbojets are an older design, in which thrust is generated primarily from the exhaust. Modern fixed-wing aircraft typically utilize turbofan and turboprop engines, in which the low pressure spool is coupled to a propulsion fan or propeller. Turboshaft engines are used on rotary-wing aircraft, including helicopters.

Across these applications, gas turbine engine components are subject to substantial operational wear and tear from working fluid, and exposed to high levels of rotational stress and strain. As a result, regular inspections and maintenance are required, particularly for the tip sections of blade and vane airfoils in the compressor, turbine and fan.

SUMMARY

This invention concerns a machining method for an engine-run airfoil, and a machine apparatus for performing the method. The method is directed to the tip profile of the airfoil, where the tip section has been displaced and rotated from its original position during engine running, manufacturing or other process. The tip is oriented in its original or nominal position, and the profile is generated by machining the tip based on an original part model of the airfoil, as defined before tip displacement, independently of the tip translation and rotation, and without respect to the relative location of the root section.

To perform the method, a weldment, airfoil tip or tip fabrication portion is formed on the tip section of the airfoil, and a machining datum is defined in a reference section adjacent the tip portion, spaced from the root section. Locator blocks are used to translate and rotate the airfoil, in order to locate the tip fabrication portion in the original or nominal tip position, as defined before displacement, and without respect to the relative position of the root section.

The nominal tip profile is fabricated or restored by machining the repair tip or tip fabrication portion along a machining path based on the part model of the airfoil, as defined with respect to the machining datum on the reference section. The machining path is thus independent of any displacement, translation or rotation of the tip section, and independent of the relative location of the root section.

DETAILED DESCRIPTION

Figure 1:
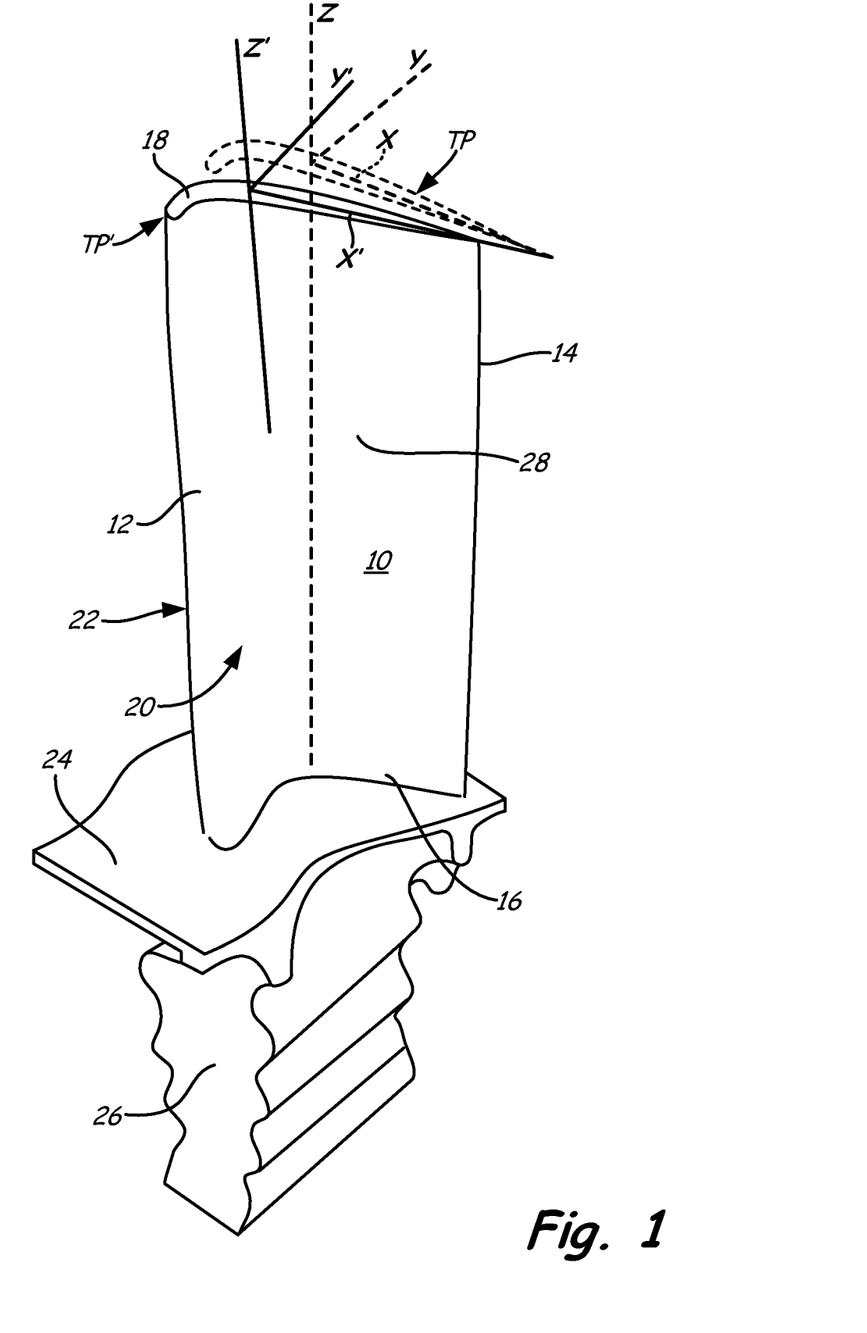
FIG. 1 is a perspective view of an airfoil, illustrating displacement and rotation of the tip section.

FIG. 1 is a perspective view of airfoil 10. Airfoil 10 extends axially from leading edge 12 to trailing edge 14. Leading and trailing edges 12 and 14 extend radially from root section 16 to tip section 18, defining pressure surface 20 (front) and suction surface 22 (back) therebetween. Tip section 18 of airfoil 10 is translated from an original or nominal tip position TP (dashed line), to displaced tip position TV (solid line).

Displacement of tip section 18 may occur due to engine running, for example as a result of stress and strain during operation of airfoil 10 in a gas turbine engine or other turbomachine. Displacement may also occur due to interaction with a foreign or domestic body, or as a result of variations in the manufacturing process. Tip section 18 may also be displaced during manufacturing to accommodate centrifugal effects, which tend to reposition the tip section 18 with respect to root section 16 during engine running.

In the particular example of FIG. 1, airfoil 10 includes inner platform 24 coupled to root section 16. Platform 24 includes attachment feature 26 for mounting airfoil 10 to a turbine, compressor or fan rotor. In other examples, airfoil 10 includes both inner and outer platforms or shroud structures, cooling holes 28, and additional internal and external features. Airfoil 10 can also be mounted to a rotor disk or hub using attachment 26 without platform 24, or directly attached to a rotating component to form an integral bladed rotor or blisk, for example by friction welding.

During turbine operations, airfoil 10 is subject to bending stresses and wear effects due to abrasion, corrosion and impact. Tip section 18 of airfoil 10 is also subject to rotational contact with the adjacent casing, resulting in additional wear. As a result, maintenance is required to restore tip section 18 to its nominal (original) height and cross-sectional profile.

The tip profile of airfoil 10 is defined during manufacturing, and before engine running, based on a part model that determines the shape or curvature of pressure and suction surfaces 20 and 22 along tip section 18, between leading edge 12 and trailing edge 14. The part model and tip profile may also include additional structure, including seal features and stepped, elliptic, flat or grooved cross-sectional profiles on tip section 18 (see, e.g., FIGS. 5A-5D).

The tip profile of airfoil 10 is originally defined in terms of nominal (pre-engine running) tip position TP, using a machining path based on nominal coordinate system (x, y, z). Coordinate system (x, y, z), in turn, is defined with respect to a reference point or machining datum located on root attachment 26 adjacent root section 16 of airfoil 10, or on adjacent platform 24.

After engine running, tip section 18 is displaced from nominal position TP to actual (engine-run) position TV, with new (engine-run) coordinates (x', y', z'). Alternatively, the displacement is due to interaction with foreign or domestic object, or during the manufacturing process as described above. Regardless, tip displacement complicates both tip fabrication and tip restoration, because actual tip position TV is translated with respect to nominal tip position TP, and actual coordinates (x', y', z') are rotated with respect to nominal coordinates (x, y, z).

As a result, the original machining path defined in terms of original position TP and root attachment 26 (or other machining datum adjacent root section 16) may be unsuitable for fabricating tip section 18 in its actual (engine run or displaced) position TV. Different machining and tip restoration techniques are thus desired, in order to accurately fabricate the nominal tip profile of airfoil 10 without respect to the displacement and rotation of tip section 18.

Figure 2A:
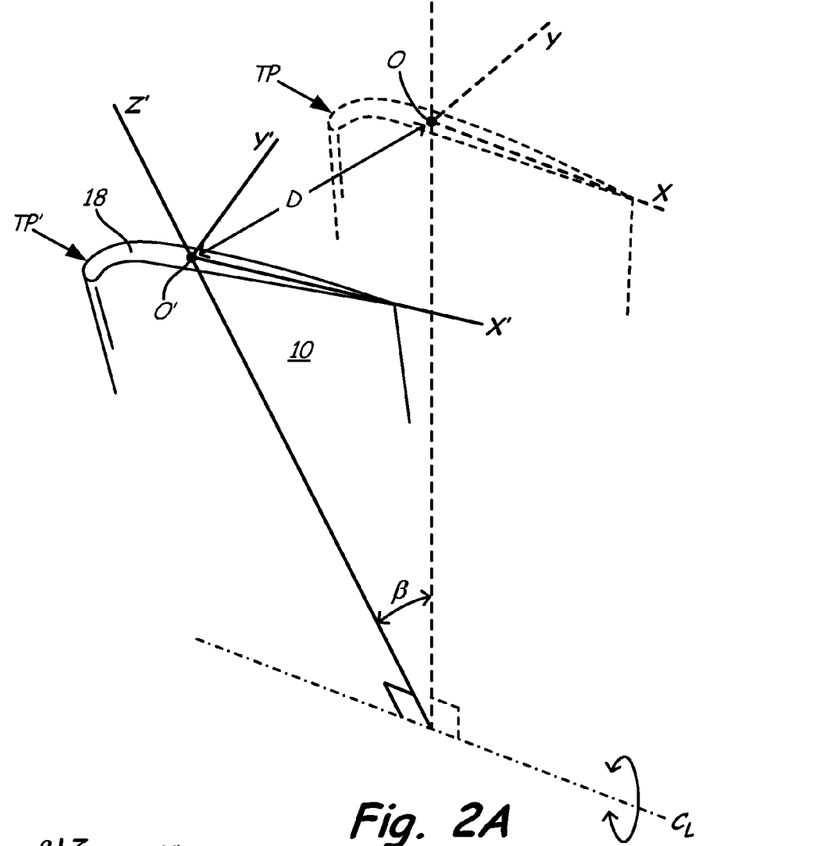
FIG. 2A is a schematic illustration of the tip section of the airfoil, showing the displacement.

FIG. 2A is a schematic illustration of airfoil 10, showing the translation of tip section 18 from nominal position TP (dashed lines) to actual TP' (solid lines). As shown in the figure, nominal (e.g., pre-engine running) coordinate system (x, y, z) defines origin O for nominal tip position TP, and actual (engine-run or otherwise displaced) coordinates (x', y', z') define origin O' for engine-run tip position TP'. Displaced tip position TP' is shifted from nominal position TP by displacement D, as defined between origins O and O'.

When airfoil 10 is mounted in a turbomachine, the original z axis is defined in a generally radial or spanwise direction, substantially perpendicular to turbine rotational axis (or centerline) $C_L$. The x axis is defined in a generally axial or chordwise direction, substantially along centerline $C_L$, and the y axis is defined in a generally circumferential sense about centerline $C_L$. The result is an orthogonal (x, y, z) coordinate system with substantially perpendicular coordinate axes x, y, z oriented along the axial, circumferential and radial directions, respectively.

Origin O of nominal tip position TP is defined along the original radial direction (z axis). In this orientation, the cross-sectional profile of tip section 18 is generated by machining airfoil 10 along a machining path defined in terms of axial and circumferential coordinates x and y, measured perpendicularly to radial coordinate z.

After displacement, tip section (or airfoil tip) 18 is translated and rotated from nominal position TP to displaced position TV. The translation and rotation may be due to a combination of operational stresses and strains, including centrifugal, thermal and blade loading effects. Additional displacement and rotation may result from blade impacts and other effects of engine running, or from engine maintenance. Alternatively tip section 18 is displaced during the manufacturing process, as described above. As a result, origin O' of displaced tip position TP' falls along new (engine-run) axis z', at the intersection of new perpendicular coordinate axes x' and y'.

In general, displacement D occurs in three dimensions, with components D=($\Delta$x, $\Delta$y, $\Delta$z) defined by the corresponding separation between displaced origin O' and original (nominal) origin O. Displacement D may also be expressed as a magnitude, where $$D=\sqrt{\Delta x^2+\Delta y^2+\Delta z^2}. \quad [1]$$

In some applications, displacement D occurs substantially in the (x, y) or axial-circumferential plane, with a relatively small component $\Delta z$ along the radial direction or z axis. In these applications, displacement D may be approximated to first or second order by $\Delta z \approx 0$. Alternatively, the z displacement is more substantial, and the full form of Equation 1 is used.

Figure 2B:
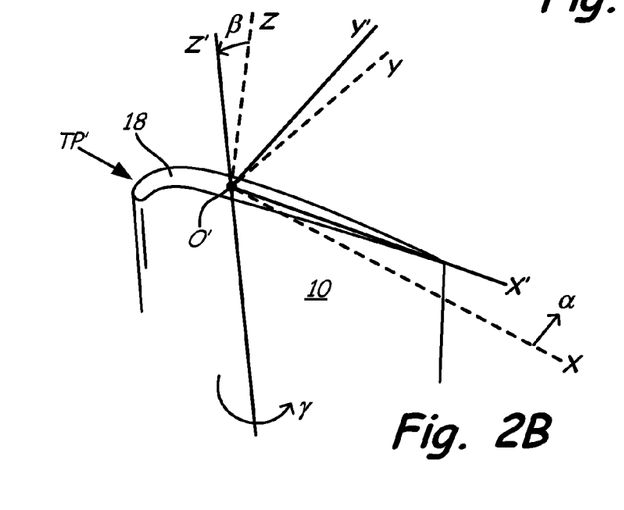
FIG. 2B is a schematic illustration of the tip section of the airfoil, showing the rotation.

FIG. 2B is a schematic illustration of airfoil 10, showing the rotation of displaced tip section 18. Tip section 18 of airfoil 10 has engine-run position TP', as defined with respect to displaced coordinate system (x', y', z'). As shown in FIG. 2B, origin O of nominal coordinate system (x, y, z) has been translated to displaced origin O', in order to illustrate the relative rotation of displaced coordinates axes (x', y', z').

In general, rotations in three dimensions can be expressed in terms of three independent rotational angles $\alpha$, $\beta$, $\gamma$. These angles are sometimes called Euler angles, and may be defined in a number of different ways.

In the particular example of FIG. 2B, the rotation of tip section 18 is represented by a first rotation about the original radial direction (z axis) by angle $\alpha$, as measured in the x-y plane. This orients the original x axis along the line of nodes, which is the intersection between the original (x, y) plane and the rotated (x', y') plane. Second, a rotation of angle $\beta$ is made about the line of nodes, orienting the z' axis into its final position as shown. A third rotation of angle $\gamma$ is made about the new z' axis, giving the new x' and y' axes their final orientation.

Second rotational angle $\beta$ is typically described as a zenith angle, and defines the angular separation between the original z and rotated z' axes. In some applications, the rotated z' axis is also oriented in a radial direction, substantially perpendicular to centerline $C_L$, so that zenith angle $\beta$ is defined in the original (y, z) plane, and measured about centerline $C_L$ (see FIG. 2A). In this situation, first rotational angle $\alpha$ may be defined as an axis or azimuth angle, measured about the z axis in the original (x, y) plane, and third rotational angle $\gamma$ may be small or substantially zero. Alternatively, third rotational angle $\gamma$ may be defined as the axis or azimuth angle, as measured about new radial axis z' in the rotated (x', y') plane, and first rotational angle $\alpha$ may be small or substantially zero.

Figure 3:
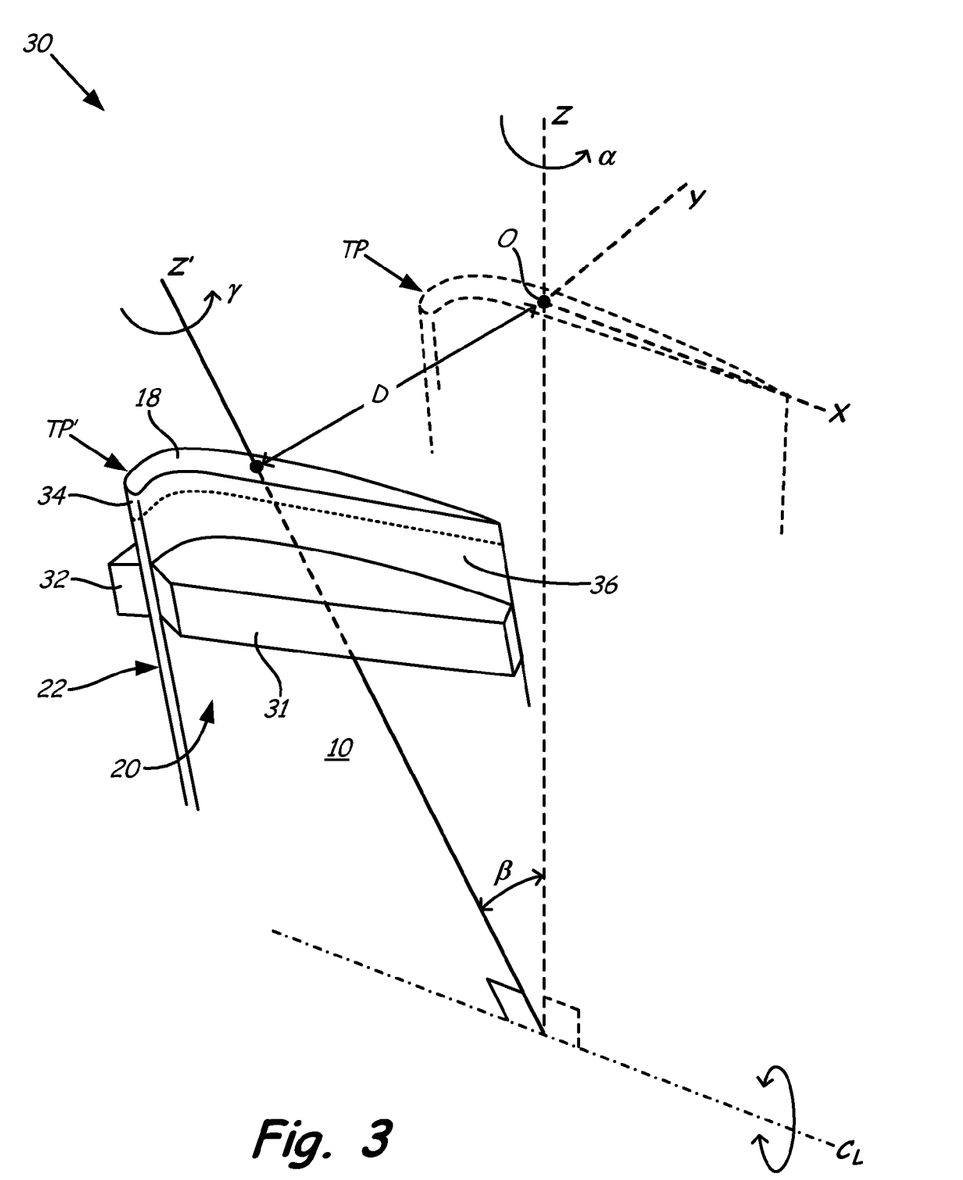
FIG. 3 is a schematic illustration of a locator apparatus for repositioning the tip section of the airfoil.

FIG. 3 is a schematic illustration of locator apparatus 30 for rotation and translation of engine-run airfoil 10 with replacement airfoil tip (or other tip fabrication portion) 34.

Locator apparatus 30 includes locator blocks (or locators) 31 and 32, which are coupled to reference section 36 of airfoil 10, adjacent tip section 18.

Airfoil 10 is conditioned or reconditioned by grinding or machining tip section 18, for example to achieve a particular height or to remove cracks and other wear features. Tip fabrication portion 34 is attached to tip section 18, for example in the form of a weldment. Locator blocks 31 and 32 are used to re-locate tip section 18 and tip fabrication portion 34 from displaced tip position TV to nominal tip position TP. The tip profile is fabricated or restored by machining tip fabrication portion 34 according to the original part model, irrespective of displacement D and rotation angles α, β and γ.

In particular, locator blocks 31 and 32 rotate and translate reference section 36 of airfoil 10 to locate tip fabrication portion 34 in original (or nominal) tip position TP, with coordinate axes aligned according to the nominal machining orientation of tip section 18. In this process, tip section 18 is translated back by displacement D to nominal origin O, and rotated (or contra-rotated) by one or more rotational angles α, β and γ, as described above, in to reorient the coordinate axes. This provides tip fabrication portion 34 with the proper position and orientation to fabricate or restore the tip contour based on the original part model, as defined before engine running, without respect to the displacement and rotation of actual (displaced) tip position TP', and regardless of the relative location of the blade root section, as described below.

Figure 4:
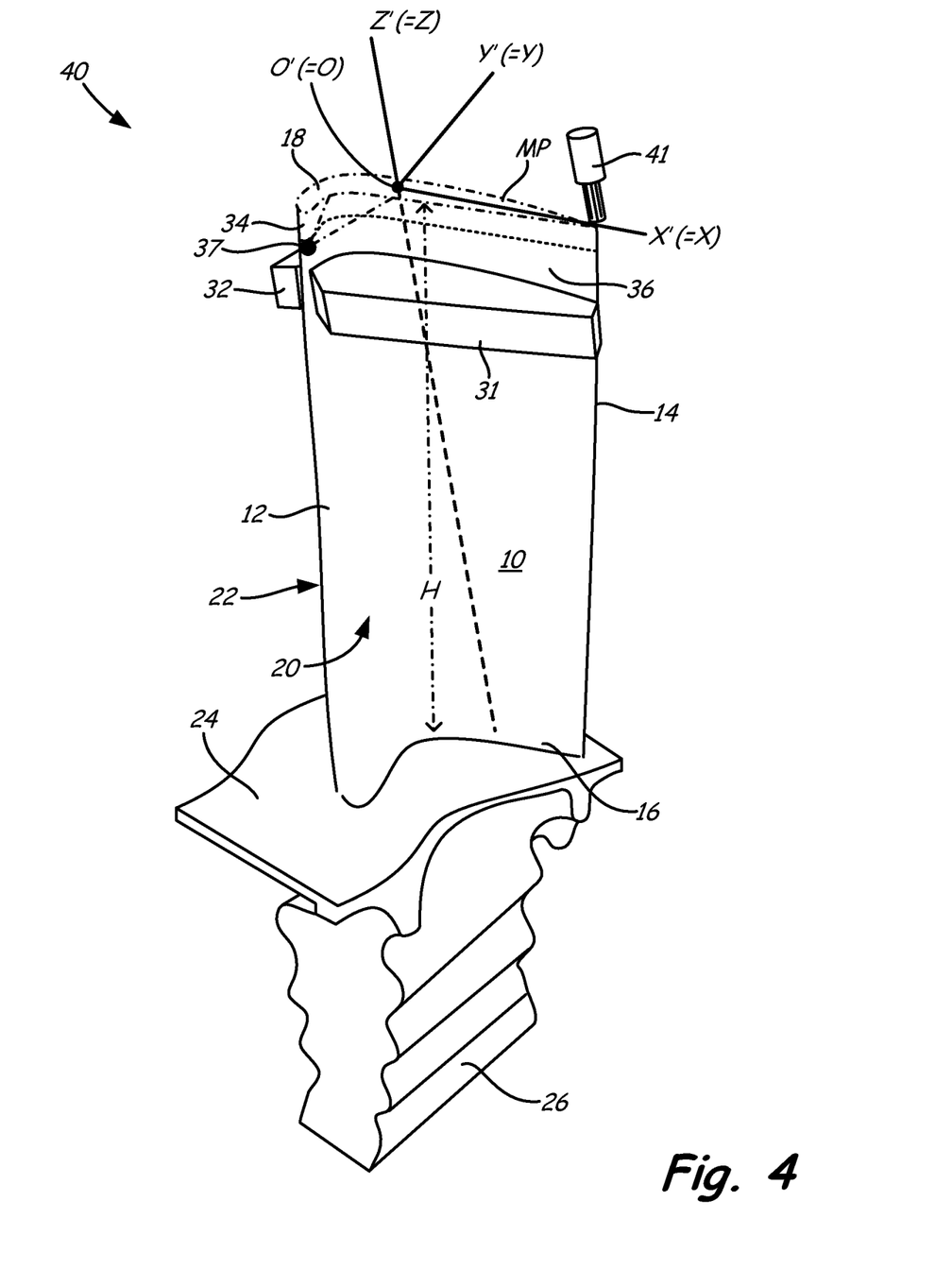
FIG. 4 is a perspective view of a machine apparatus for fabricating the tip profile of an airfoil.

FIG. 4 is a schematic illustration of machine apparatus 40, configured to fabricate or restore a nominal or original tip profile on tip section 18 of airfoil 10. Machine apparatus 40 includes locator blocks 31 and 32 coupled to reference section 36 of airfoil 10, in combination with machine tool 41 for machining tip fabrication portion 34.

Machine tool 41 includes a mill, grinder or other machining or cutting element to restore the tip profile of airfoil 10 by grinding or machining tip fabrication portion 34 along machining path MP. In this technique, machining path MP is based on the original part model of airfoil 10, but is defined respect to new reference datum (or machining datum) 37 on reference section 36, rather than root attachment 26, or other machining reference or datum adjacent root section 16. Thus, machining path MP depends only on the relative position of tip section 18 with respect to new machining datum 37 and adjacent reference section 36, regardless of the actual rotation and displacement of tip section 18, either during engine running or during the manufacturing process.

As shown in FIG. 4, tip fabrication portion 34 provides airfoil 10 with at least nominal blade height H, as defined between root section 16 and original origin O, or as measured from root section 16 to engine-run origin O'. Locator blocks 31 and 32 reposition and rotate reference section 36 of airfoil 10 to provide tip fabrication portion 34 in nominal tip position TP, with displaced coordinate axes (x', y', and z') of displaced tip section 18 oriented along nominal machining axes (x, y, z), as defined before displacement, e.g., by engine running.

Thus, replacement tip (tip fabrication portion) 34 has the nominal machining position and angular orientation as tip section 18, as defined before tip displacement, regardless of any engine-run or other translation and rotation, and without respect to the relative location of root section 16 and attachment 26. This allows machining path MP for machine tool 41 to be defined with respect to new machining datum 37 on reference section 36 of airfoil 10, independent of the tip displacement and rotation, and independent of the relative or absolute location of root section 16 and any machining reference or datum on attachment 26.

New machining datum 37 is defined as an actual or virtual reference point for machining path MP on tip fabrication portion 34, where the position of machining datum 37 varies along reference section 36, adjacent tip section 18. Similarly, the position of the original machining datum varies on root attachment feature 16, or on platform section 24 adjacent root section 16.

As shown in FIG. 4, however, new reference datum 37 is substantially closer to machining path MP than root attachment 26 and root section 16, which are spaced from machining path MP by substantially the full blade height H, or more. In contrast, the shortest radial distance from machining path MP to new datum 37 is less than half of blade height H, and typically less than ten or twenty percent of blade height H. Conversely, new machining datum 37 is spaced from root section 16 and adjacent root datum by more than half of blade height H, typically more than seventy or eighty percent of blade height H.

This contrasts with other tip fabrication techniques, where machine path MP is defined with respect to a distant root datum on attachment 26 or adjacent root section 16, with the machining reference separated from the machining path by more than half of blade height H, substantially all of blade height H, or more than blade height H. In these other techniques, the actual position of tip section 18 is displaced from the nominal machining path, for example due to bending and twisting of airfoil 10, either during engine running or as part of the manufacturing process.

Where machining path MP is defined with respect to new machining datum 37, however, as described here, the nominal machining path and actual tip location coincide. This allows tip fabrication portion 34 to be accurately machined based on the original part model, in order to provide the nominal tip profile independently of any displacement or rotation of tip section 18 with respect to root section 16 and root attachment 26.

The method of FIG. 4 contrasts with adaptive machining techniques, in which the machining path is recalculated based on measurements of the tip displacement and rotation with respect to root section 16, or an adjacent root datum. In particular, existing forms of adaptive machining require highly accurate measurements, and the blade height creates a substantial lever arm that amplifies any angular displacement between root section 16 and the machining path on engine-run tip section 18. As a practical matter, therefore, it is difficult and time consuming to use these existing techniques on bent or twisted airfoils, because they require that all six independent rotational and displacement variables be determined to a very high degree of accuracy in order to machine the tip profile to the desired accuracy and tolerance.

Machine apparatus 40 overcomes these limitations by using locator blocks 31 and 32 to position tip fabrication portion 34 in the nominal machining orientation, with machine tool 41 following the original machining path to fabricate a nominal profile on tip section 18, as defined by the part model before engine running or other displacement. Machine apparatus 40 also reduces errors, scrap and wastage due to inaccurate measurements and calculations, with less machining time and cost because all airfoils 10 in a given class can be processed in substantially the same manner, using substantially the same machining path MP, and based on the same original part model, without regard to the displacement and rotation of tip section 18 with respect to root section 16.

Figure 5:
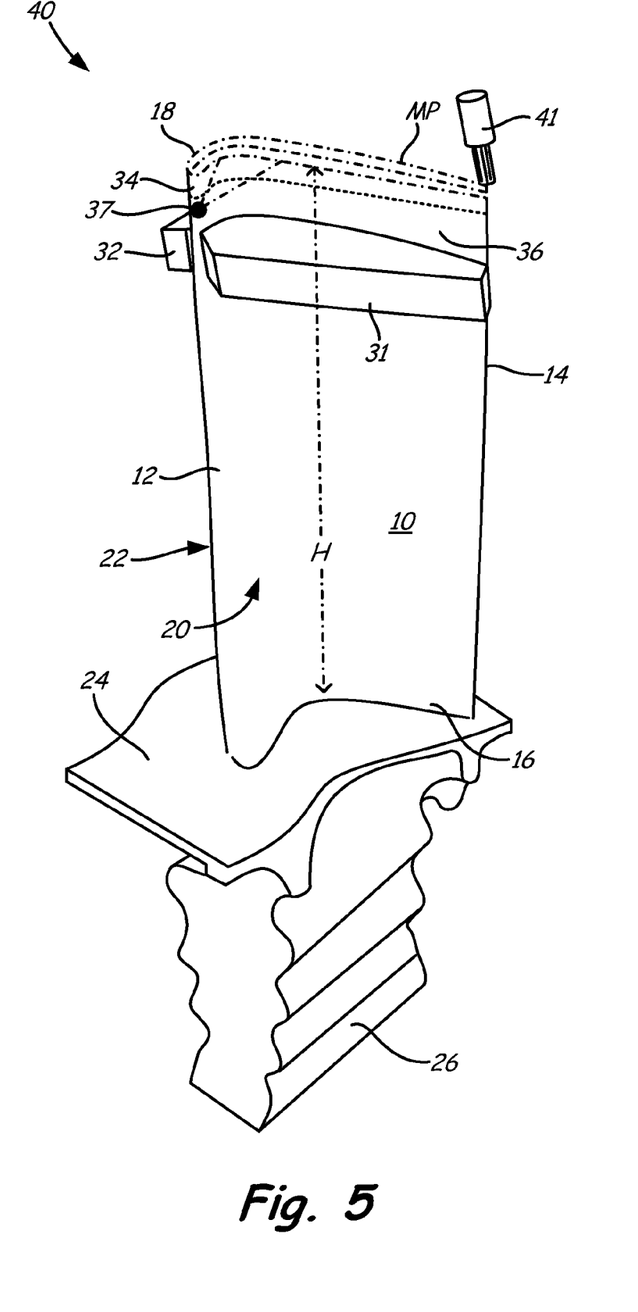
FIG. 5 is a perspective view of an airfoil with additional structure in the tip section.

FIG. 5 is a schematic view of machine apparatus 40 for fabricating or restoring a nominal tip profile on airfoil 10, illustrating a method for machining additional structure on tip section 18. As shown in FIG. 5, machine tool 41 fabricates the nominal tip profile on airfoil 10 by machining tip fabrication portion 34 along machine path MP, at blade height H. Machine path MP is based on the original part model of airfoil 10, and defined with respect to new machining datum 37 on reference section 36, independent of the relative displacement and rotation of tip section 18 with respect to root section 16, or with respect to a datum or other machining reference adjacent root section 16.

Figure 5A:
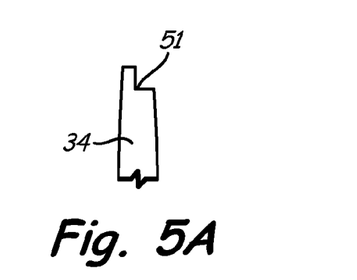
FIG. 5A is a cross-sectional view of an airfoil tip with a stepped cross section.
Figure 5B:
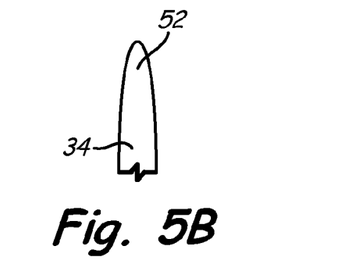
FIG. 5B is a cross-sectional view of an airfoil tip with an elliptic cross section.
Figure 5C:
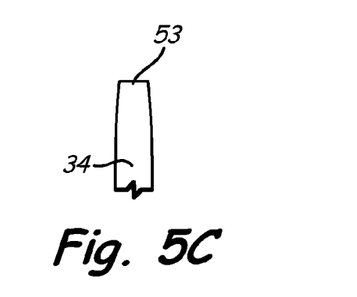
FIG. 5C is a cross-sectional view of an airfoil tip with a flat cross section.
Figure 5D:
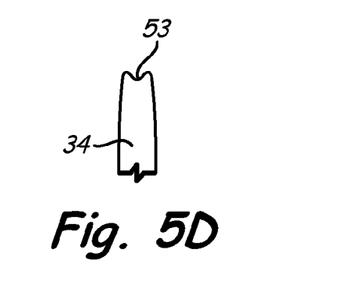
FIG. 5D is a cross-sectional view of an airfoil tip with a grooved cross section.

In the particular example of FIG. 5, machine tool 41 also defines seal feature 50 on tip fabrication portion 34, for example a squealer tip, or another seal or tip feature having a stepped or contoured cross-section 51 with radially spaced inner and outer tip surfaces, as shown in FIG. 5A. Alternatively, machine tool 41 defines a sharp or rounded elliptic tip section 52 on tip fabrication portion 34, as shown in FIG. 5B, or flat tip section 53, as shown in FIG. 5C. In other examples, machine tool 41 defines a grooved seal feature or other grooved tip feature 54 on tip fabrication portion 34, as shown in FIG. 5D.

Figure 6:
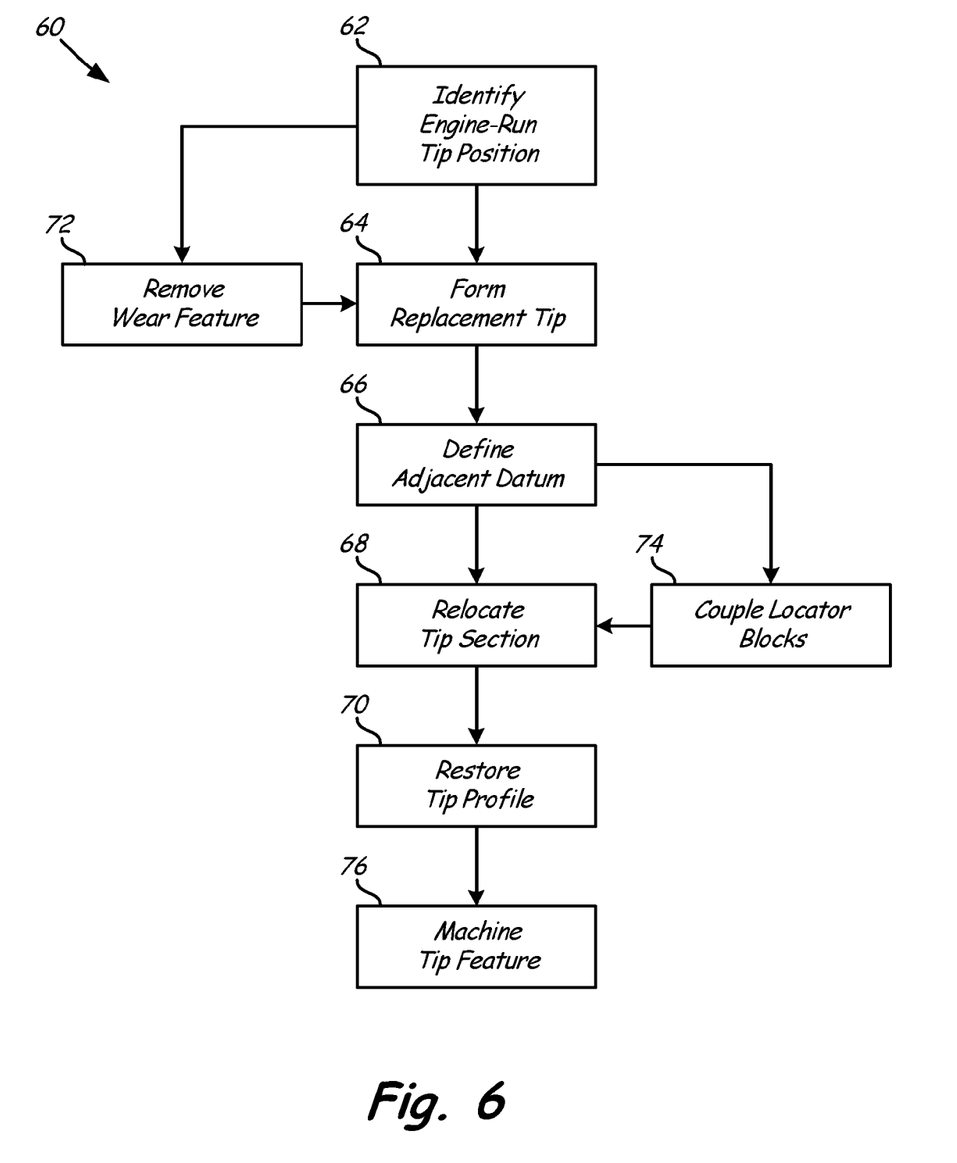
FIG. 6 is block diagram illustrating a machining method for fabricating a tip profile on an airfoil.

FIG. 6 is a block diagram illustrating machining method 60 for fabricating or restoring the tip profile of an airfoil. Machining method 60 includes identifying and verifying the tip position (step 62), forming a tip fabrication portion (step 64) on the airfoil, defining a machining datum in a reference section (step 66) adjacent the tip section, relocating the tip section (step 68) to a nominal tip position, and fabricating the nominal tip profile (step 70).

In some methods, wear features are removed by machining (step 72) prior to forming the tip fabrication portion as a replacement tip or weldment. In additional methods, locator blocks are coupled to the reference section adjacent the tip section (step 74), in order to locate the tip fabrication portion in a nominal position and orientation for machining the tip profile. In further methods, additional seal or tip features can also be machined onto the tip fabrication portion (step 76).

Verifying the engine-run or otherwise displaced tip position (step 62) includes identifying the displaced tip position of an airfoil, for example after engine running or during manufacturing, and determining a displacement and at least one rotation angle with respect to the nominal tip position. In general, the nominal (or original) tip position is defined with respect to the root section, before engine running, based on the part model when the blade was manufactured.

The tip section is worn during engine operations, or ground during manufacturing, and the airfoil tip is translated and rotated due to airfoil loading and other effects, as described above. If the degree of tip loss, displacement or rotation exceeds a design limit, the blade may be scrapped, and the tip profile may not be reconditioned or fabricated. If the degrees of tip loss, displacement and rotation are less than their respective reconditioning limits, the blade tip can be reconditioned or fabricated according to machining method 60.

Fabrication and reconditioning limits vary with airfoil size and other factors. In smaller scale airfoils with span height of a few inches of less, the tip wear or loss limit may be 0.050 inch (1.27 mm) or less, or 0.100 inch (2.54 mm) or less, and the tip displacement limit may be similar. In larger scale airfoils, including compressor and turbine airfoils with span heights of more than a few inches ranging to fan airfoils with span heights of a few feet or more, the tip wear or loss limit may be larger, for example 0.200 inch (5.08 mm) or more. For rotations, a substantially scale invariant fabrication, conditioning or reconditioning limit may be defined, for example about one degree or less ($\leq 1°$), or about two degrees or less ($\leq 2°$).

Forming a tip fabrication portion or replacement tip (step 64) provides the tip section of the airfoil at its nominal height, as defined by the part model. Typically, the airfoil tip may be ground or machined (step 72) to remove cracks, pits, abrasions and other features, and may be chemically treated to prepare for attachment of the tip fabrication portion to the ground surface.

For superalloy blades and other metal workpieces, the tip fabrication portion is generally formed as a weldment, for example by welding a metal alloy onto the tip of the airfoil, or by other additive machine processes. Alternatively, chemical bonding and other techniques are used, for example to fabricate tip profiles on composite airfoils. In cases of substantial wear, two or more successive weldments or tip fabrication portions may be used, in order to provide the airfoil with its full blade height.

Defining a machining datum (step 66) provides a local reference point for the machining path, which is used to fabricate or restore the nominal or original profile to the tip. Machining errors are reduced by defining a new machining datum adjacent the replacement tip, close to the machining path, rather than in the root section, which is separated from the machining path by substantially the full blade height.

The displaced tip section is relocated (step 68) by translation and rotation of the airfoil, orienting the tip fabrication portion in the nominal tip position for machining. Tip relocation is performed without reference to the actual (displaced or engine-run) position of tip section, or the relative position of the root section, but is instead defined based on the new machining datum and reference section adjacent the tip section.

This approach substantially reduces machining errors, because it allows the tip profile to be restored along the original machining path, as defined before engine running, based on the original part model and independent of any translation or rotation of the airfoil tip with respect to the root. Processing time and error rates are also reduced, because the machining path is the same for every airfoil in the class, independent of the different rotations and displacements that occur, which must be individually accounted for in other techniques.

For more accurate positioning, locator blocks can be coupled (step 74) to the reference section, adjacent the tip section. This locator block placement reduces errors in positioning and orientation of the tip fabrication portion, for additional improvement in machining performance.

The tip profile is fabricated or restored (step 70) by machining the tip along a machining path defined with respect to the reference section, independent of the root section. In particular, the machining path is defined by the original part model of the airfoil, as described above, independently of any tip displacement or rotation. In some applications, additional tip or seal features are machined onto the replacement tip (step 76), for example any of the features described in FIGS. 5 and 5A-5D, above.

The techniques described here are applicable when the tip section is displaced by more than the machine tolerance, in which case machining coordinates based on the root section or an adjacent root datum are not useful for restoring the tip profile. The machining techniques also apply when the engine-run tip section is rotated, for example by at least 0.10° or at least 0.20°, or by half a degree) (0.50° or one degree (1°) or more, where such rotations can also displace the tip section by more than the machining tolerance.

Note that the machining tolerance is distinguished from the angular rotation and displacement limits for conditioning or reconditioning the airfoil. In some applications, for example, the machining tolerance for the tip profile is less than ten mils (0.010 inch, or 0.254 mm), or less than five mile (0.005 inch, or 0.127 mm). Machining method 60, however, can still be applied when the airfoil tip is displaced by more than this machining tolerance, or by more than twice this machining tolerance, for example by up to 0.10 inches (2.54 mm) or more, or up to 0.20 inches (5.08 mm) or more.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. A method comprising:
    identifying an engine-run tip position for an airfoil having a tip section and a root section, the engine-run tip position having a displacement and a rotation with respect to an original tip position, wherein the original tip position is defined with respect to the root section before engine running;
    forming an airfoil tip on the tip section of the airfoil;
    defining a machining datum adjacent the airfoil tip, wherein the machining datum is spaced from the root section;
    deforming the airfoil to locate the airfoil tip in the original tip position, independent of a position of the root section; and
    machining the airfoil tip of the deformed airfoil along a machining path to restore a tip profile on the engine-run airfoil, wherein the machining path is defined with respect to the machining datum adjacent the tip section and is independent of the displacement and rotation of the engine-run tip position, and independent of the position of the root section.

2. The method of claim 1, wherein forming the airfoil tip comprises forming a weldment on the tip section to restore an original height of the airfoil, as defined before engine running.

3. The method of claim 2, further comprising grinding the tip section to remove wear features prior to forming the weldment.

4. The method of claim 2, wherein restoring the tip section comprises machining the weldment along the machining path to restore the tip profile at the original height of the airfoil.

5. The method of claim 4, further comprising machining a seal feature onto the airfoil tip.

6. The method of claim 4, further comprising machining the airfoil tip to produce an elliptic cross section.

7. The method of claim 1, wherein machining the airfoil tip restores the original tip profile within a machining tolerance, and wherein the displacement distance is at least twice the machining tolerance.

8. The method of claim 7, wherein the machining tolerance is 0.01 inch (0.254 mm) or less.

9. The method of claim 7, wherein the displacement is at least 0.02 inch (0.508 mm).

10. The method of claim 7, wherein the rotation is at least one half degree (0.5°).

* * * * *